United States Patent
Nakayama

[11] Patent Number: 5,262,950
[45] Date of Patent: Nov. 16, 1993

[54] TORQUE DISTRIBUTION CONTROL APPARATUS FOR FOUR WHEEL DRIVE

[75] Inventor: Yasunari Nakayama, Hiroshima, Japan

[73] Assignee: Mazda Motor Corporation, Hiroshima, Japan

[21] Appl. No.: 686,627

[22] Filed: Apr. 18, 1991

[30] Foreign Application Priority Data

Apr. 20, 1990 [JP] Japan .................... 2-105954

[51] Int. Cl.$^5$ ............................................. B60K 17/34
[52] U.S. Cl. .............................. 364/424.05; 180/197; 280/91
[58] Field of Search ............. 364/424.01, 424.05, 364/424.1, 426.01, 426.03; 280/91; 180/197, 249; 74/866

[56] References Cited

U.S. PATENT DOCUMENTS

| | | | |
|---|---|---|---|
| 4,702,341 | 10/1987 | Taga et al. ........................ | 180/249 |
| 4,833,612 | 5/1989 | Okuno et al. ................... | 364/426.04 |
| 4,926,329 | 5/1990 | Stelter et al. .................... | 364/424.01 |
| 5,009,279 | 4/1991 | Matsuda ............................. | 180/197 |
| 5,010,974 | 4/1991 | Matsuda ............................. | 180/233 |
| 5,032,995 | 7/1991 | Matsuda et al. ................. | 364/424.03 |
| 5,060,747 | 10/1991 | Eto ....................................... | 180/197 |
| 5,099,944 | 3/1992 | Kageyama et al. ................. | 180/249 |

FOREIGN PATENT DOCUMENTS

| | | |
|---|---|---|
| 0335335 | 10/1989 | European Pat. Off. . |
| 3720459 | 12/1987 | Fed. Rep. of Germany . |
| 4002821 | 9/1990 | Fed. Rep. of Germany . |
| 1247221 | 3/1988 | Japan . |

*Primary Examiner*—Thomas G. Black
*Attorney, Agent, or Firm*—Sixbey, Friedman, Leedom & Ferguson

[57] ABSTRACT

The torque distribution for four wheels is controlled corresponding to the operating conditions of a car. There are provided a plurality of control systems such as a system for controlling the torque distribution for front and rear wheels, a system for controlling the torque distribution for right and left wheels, and the like. When the torque required for predetermined torque distribution exceeds the excess torque of an engine, the priority of the control systems to execute the control is changed depending on a friction coefficient caused between the road and tires.

11 Claims, 12 Drawing Sheets

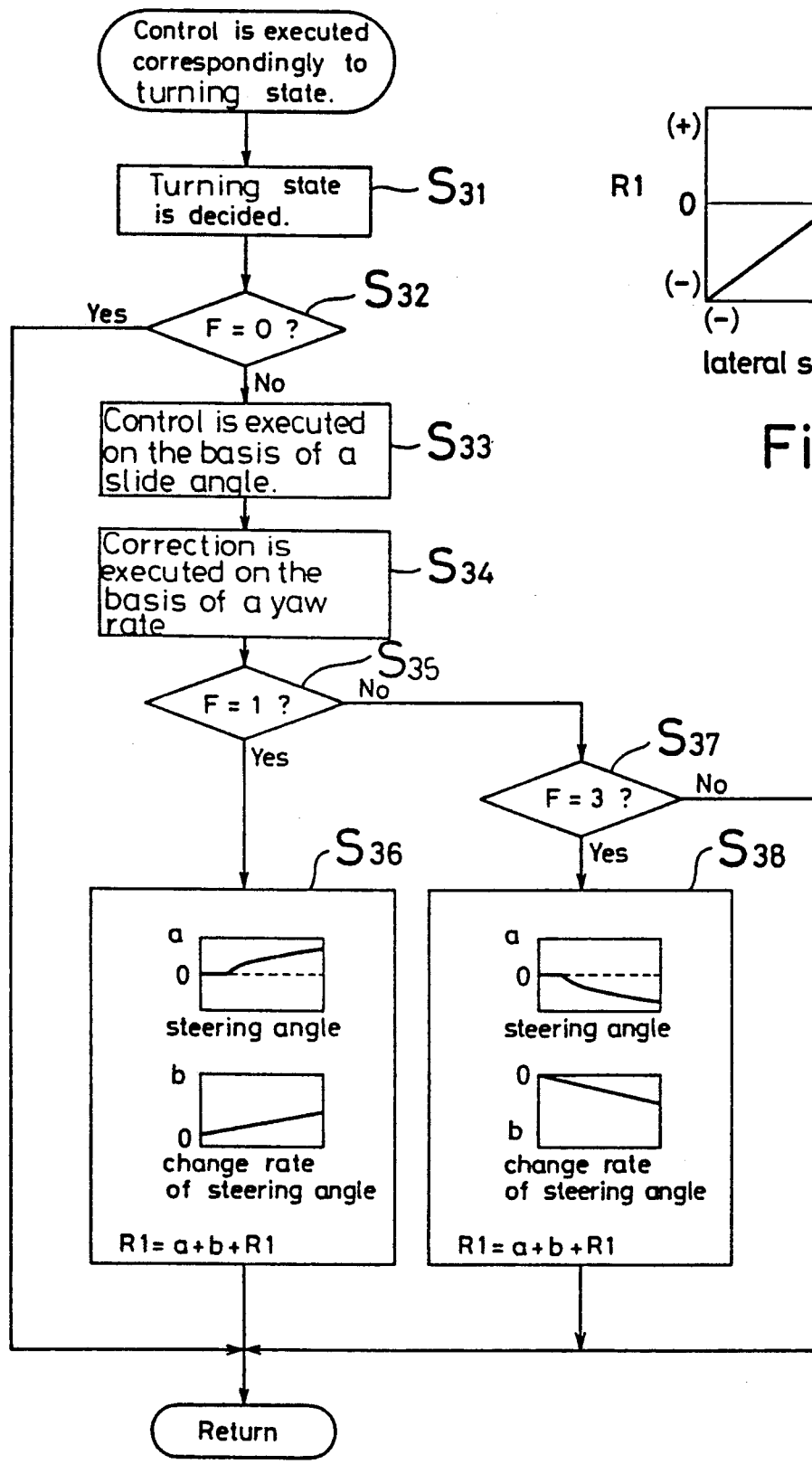

TORQUE DISTRIBUTION CONTROL APPARATUS FOR FOUR WHEEL DRIVE

BACKGROUND OF THE INVENTION

In general, there has been known a torque distribution control apparatus for a four wheel drive which drives four wheels by engine outputs, wherein the torque distribution for each wheel is not always equivalent but is variably controlled so as to become optimum correspondingly to operating conditions.

For example, Japanese Unexamined Patent Publication No. 1-247223 has disclosed that the turning movement of a car is classified under three parts at the time of turning start, during turning and at the time of turning escape, so that the torque distribution is carried out correspondingly to the turning state of the car. In other words, the torque distribution on the rear wheel side is increased in order to enhance the small turn of the car. In addition, the torque distribution on the front wheel side is increased in order to enhance straightness at the time of turning escape.

Load movement occurs according to the operation of the car such as acceleration, turning and the like. The load movement causes the driving force allowed by the wheels to be ununiform. Japanese Unexamined Patent Publication No. 1-247221 has disclosed that the torque distribution for the four wheels is changed correspondingly to the load movement, the braking force is properly applied to the wheels so as to change the torque distribution, and the engine outputs are increased in order not to cause the entire driving torque to be lowered according to the braking force.

In the case where the torque distribution is changed by combining a plurality of control operations, i.e., torque distribution control corresponding to the turning state of the car and torque distribution control corresponding to the load movement, the torque required to change the torque distribution may not be obtained according to the operating conditions of an engine even if the engine outputs are increased. In this case, when the torque distribution control is executed, the car is decelerated according to the braking force which is applied to the wheels or the torque distribution is made insufficient so that the desired running cannot be obtained.

Depending on a friction coefficient (hereinafter referred to as $\mu$ if necessary) of a road, there is executed the change of torque distribution which is unnecessary or lowers the running stability of the car. In other words, there is remarkably lowered the responsibility such as the occurrence, decrease or the like of the lateral acceleration or yaw rate for a steering quantity on a low $\mu$ road. Accordingly, if the distribution corresponding to the load movement is carried out with priority at the time of turning escape in similar to a high $\mu$ road, the yaw movement is prevented from being decreased. Consequently, the operation of drivers correction is increased. At the time of turning start, it is desired that the lateral torque distribution is carried out so as to quickly cause the lateral acceleration, yaw rate and the like without enhancing grip force of the front wheels by decreasing front wheels driving force.

SUMMARY OF THE INVENTION

It is an object of the present invention to execute the torque distribution corresponding to the state of a road by combining a plurality of control systems.

It is another object of the present invention to select a control system, which executes the control correspondingly to the state of the road, so as to carry out the proper torque distribution when the torque required to change the torque distribution cannot be obtained even if the engine outputs are increased.

To achieve the above-mentioned objects, the present invention provides a torque distribution control apparatus comprising torque distribution change means, engine output change means, torque distribution control means, and control system selection means. The torque distribution change means adjusts a quantity of engine outputs to be transmitted to the right and left front wheels and the right and left rear wheels so as to change the torque distribution for four wheels. The engine output change means compensates for the torque required to change the torque distribution by increasing the engine outputs. The torque distribution control means has a plurality of control systems for setting the toque distribution ratios for the four wheels and controls the torque distribution change means and engine output change means corresponding to the operating conditions on the basis of the control systems. In the case where the torque required to change the torque distribution by the control systems of the torque distribution control means is not obtained even if the engine outputs are changed by the engine output change means, the control system selection means selects the control system to execute the control depending on a friction coefficient of the road which is detected by friction coefficient detection means.

The torque distribution change means can adjust the quantity of the engine outputs to be transmitted by controlling braking devices 11 to 14 provided on wheels 6 to 9.

The engine output change means changes the engine outputs by changing the throttle opening of the engine by means of an actuator.

There can be provided a longitudinal distribution control system and a lateral distribution control system as the control systems. The longitudinal distribution control system changes the torque distribution for the front and rear wheels corresponding to the operating conditions of the car, for example, the load movement rate or turning state of the car, slip rates of the wheels or the like. The lateral distribution control system changes the torque distribution for the right and left wheels corresponding to the operating conditions of the car.

There can be provided a load movement correspondence control system, a turning state correspondence control system and a slip rate correspondence control system as the control systems. The load movement correspondence control system controls the torque distribution for the four wheels corresponding to the load movement rate of the car. The turning state correspondence control system controls the torque distribution for the four wheels corresponding to the turning state of the car. The slip rate correspondence control system controls the torque distribution for the four wheels corresponding to the slip rates of the wheels.

There is provided running state detection means for detecting the turning state of the car in order to select the control systems. When the friction coefficient of the road is low, the lateral distribution control system can be selected at the time of turning start and the longitudinal distribution control system can be selected at the time of turning escape. When the friction coefficient of the road is high, the lateral distribution control system can be selected.

When the friction coefficient of the road is low, the slip state correspondence control can be executed with first priority and then the turning state correspondence control can be executed at the time of turning start and turning escape.

According to the torque distribution control apparatus, in the case where the engine output change means changes the engine outputs so that the torque required to change the torque distribution by the control systems of the torque distribution control means can be obtained, the torque distribution for the wheels is changed by combining the control systems mentioned above. In the case where the required torque cannot be obtained even if the engine outputs are changed, the control system selection means selects the control system to execute the control corresponding to the friction coefficient of the road. The torque distribution is changed and controlled by the selected control system depending on the torque obtained by changing the engine outputs such that the desired effect can be produced.

If the lateral distribution control system is selected at the time of turning start and the longitudinal distribution control system is selected at the time of turning escape when the friction coefficient of the road is low, the torque distribution for turning outer wheels is increased at the time of turning start so that the small turn of the car can be enhanced. In addition, the torque distribution for the rear wheels is decreased at the time of turning escape so that the slip or excessive autorotation of the wheels can be prevented. Consequently, the straight running can be smoothly attained at the time of turning escape.

When the friction coefficient of the road is high, the lateral acceleration, yaw rate or the like is quickly decreased at the time of turning escape. Consequently, if the lateral distribution control system is selected, the excessive torque is not applied to the torque distribution control for the front and rear wheels which are not so necessary. Accordingly, the torque distribution control for the right and left wheels can sufficiently be executed. In addition, the turning of the car can greatly be stabilized.

In brief, in the case where the torque required to change the torque distribution by the control systems cannot be obtained even if the engine outputs are changed, the control system selection means selects the control system to execute the control depending on the friction coefficient of the road. Consequently, the proper torque distribution corresponding to the state of the road can be carried out depending on the torque obtained by changing the engine outputs without decelerating the car. As a result, the running stability can be enhanced.

When the friction coefficient of the road is low, the lateral distribution control system is selected at the time of turning start and the longitudinal distribution control system is selected at the time of turning escape. Consequently, there can be enhanced the small turn of the car at the time of turning start. In addition, the straight running can be smoothly attained at the time of turning escape.

When the friction coefficient of the road is high, the lateral distribution control system is selected. Consequently, the engine outputs are not taken away by the torque for other controls so that the torque distribution control for the right and left wheels can sufficiently be carried out. As a result, the running stability of the car can be improved.

These and other objects, features and advantages of the present invention will become more apparent upon a reading of the following detailed description and drawings.

BRIEF DESCRIPTION OF THE DRAWINGS

FIGS. 2 to 15 are views showing an embodiment of the present invention;

FIG. 2 is a view showing an entire structure;

FIG. 3 is a circuit diagram showing torque distribution change means (a brake controller);

FIG. 4 is a flow chart of the entire torque distribution control;

FIG. 5 is a flow chart for $\mu$ decision;

FIG. 6 is a characteristic chart showing the relationship between output torque and accel opening (accelerator pedal position);

FIG. 7 is a view showing the change of a wheel speed according to the connection and interception of a clutch;

FIG. 8 is a flow chart of load movement correspondence control;

FIG. 9 is a characteristic chart showing the relationship between the wheel speed and a factor A;

FIG. 10 is a flow chart of turning state correspondence control;

FIG. 11 is a characteristic chart showing the relationship between a lateral slide angle and a longitudinal distribution ratio of front and rear wheels;

FIG. 12 is a flow chart of slip correspondence control;

FIG. 14 is a flow chart for calculating shaft output torque; and

FIG. 15 is a flow chart of engine and brake control.

DETAILED DESCRIPTION OF A PREFERRED EMBODIMENT

A preferred embodiment of the present invention will be described with reference to the drawings.

Explanation of an entire structure

Figure 1:
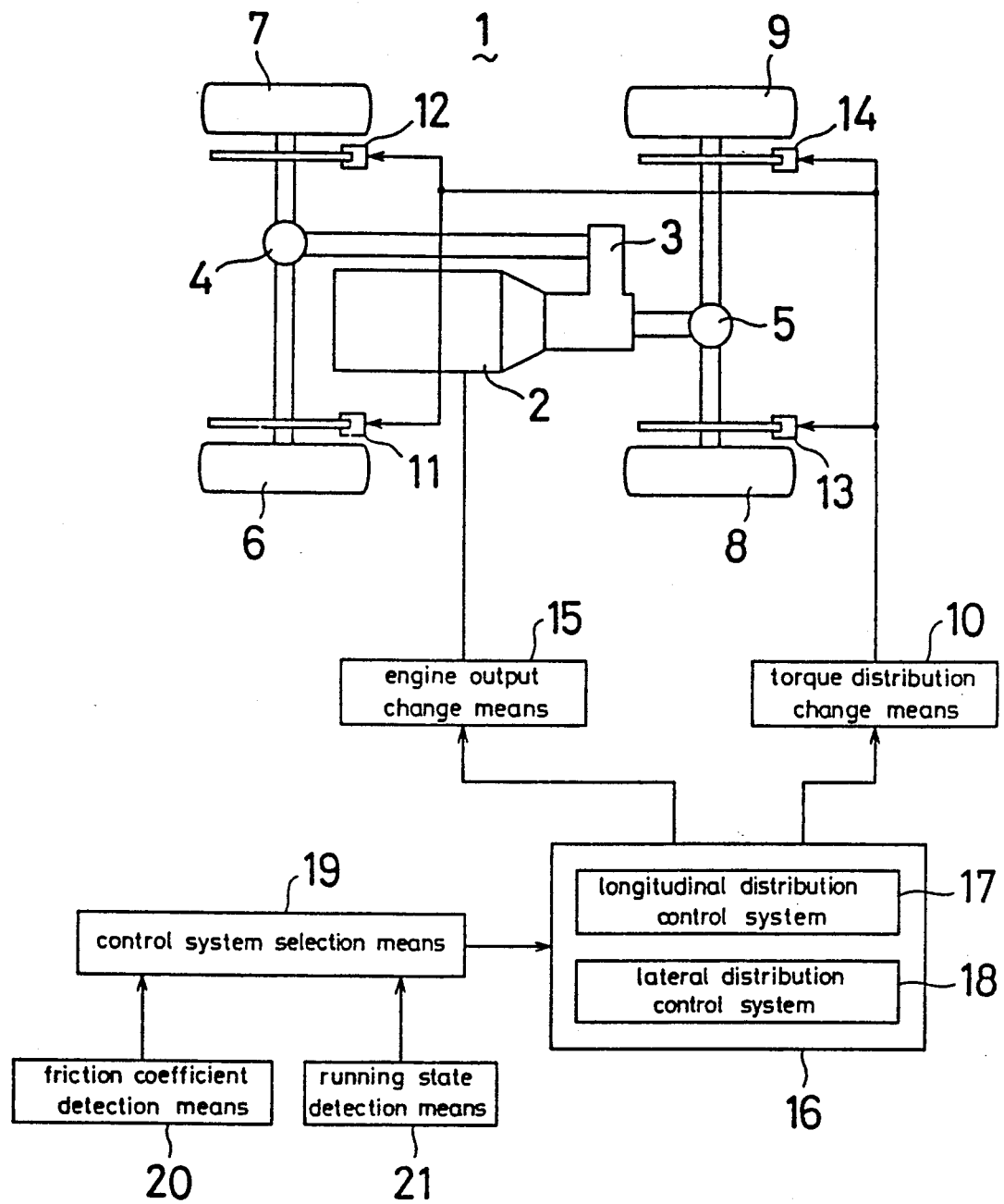
FIG. 1 is a view showing an entire structure according to the present invention.
Figure 2:
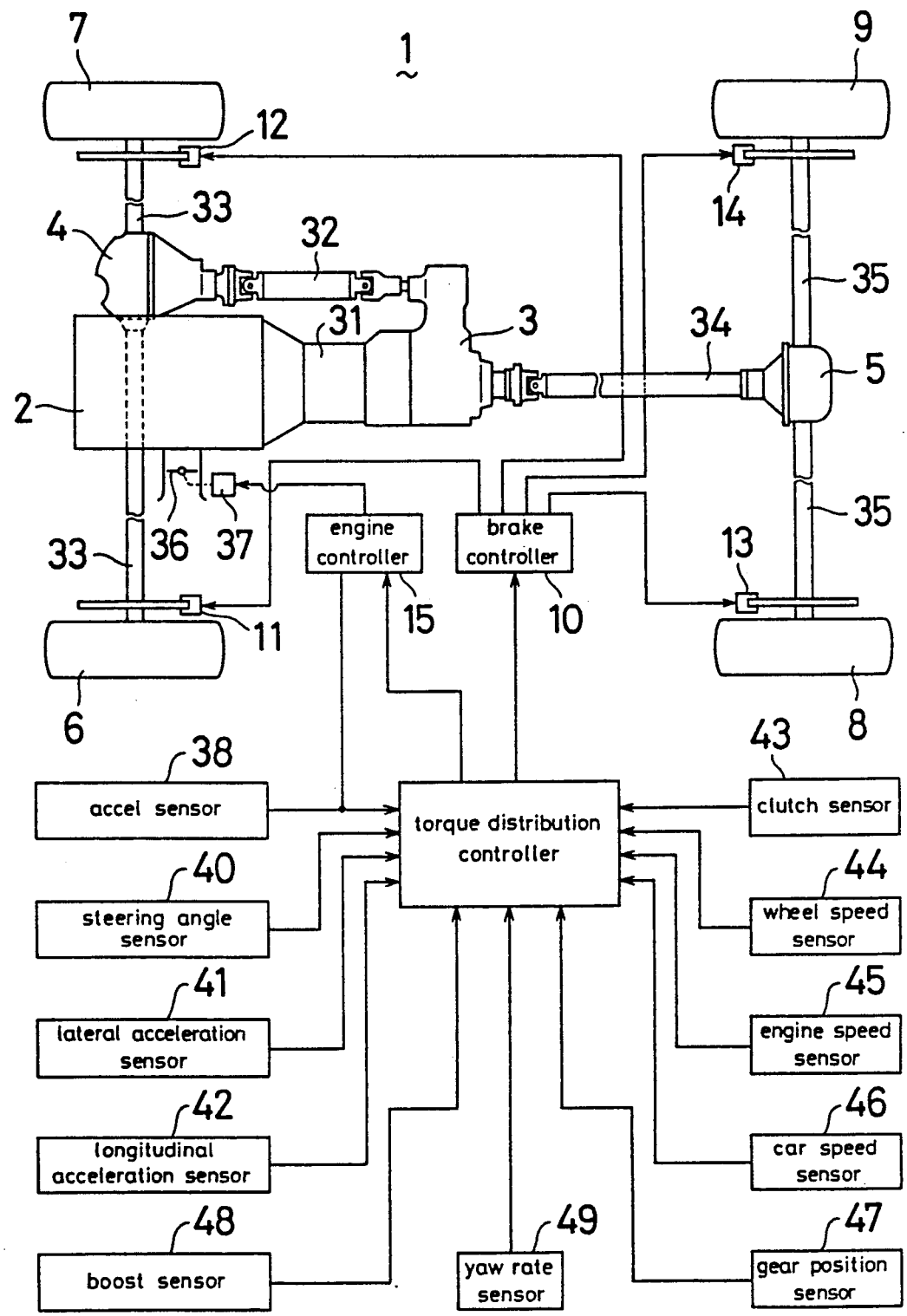

As shown in FIGS. 1 and 2, an output of an engine 2 is inputted to a transfer 3 through a transmission 31. The transfer 3 has a center differential for equally transmitting an engine output to front and rear wheel sides. A front differential 4 is connected to an output shaft 32 on the front wheel side of the transfer 3. Right and left front wheels 6 and 7 are connected to the front differential 4 through a front wheel driving shaft 33. Similarly, a rear differential 5 is connected to an output shaft 34 on the rear wheel side of the transfer 3. Right and left rear wheels 8 and 9 are connected to the rear differential 5 through a rear wheel driving shaft 35.

A brake controller 10 as torque distribution change means includes a braking pressure control valve and an actuator. The braking pressure control valve separately controls the braking pressure to be supplied to braking devices 11 to 14 provided on the wheels 6 to 9. A throttle valve 36 of the engine 2 has its opening adjusted by a throttle motor 37. An engine controller 15 as engine output change means receives an accel signal from an accel sensor 38 which detects a quantity of accel operated by drivers, and then outputs an operation control signal to the throttle motor 37 so as to adjust the opening of the throttle valve 36 corresponding to the quantity of accel operated by the drivers. In addition, the engine controller 15 receives a control signal from a torque distribution controller 16 as torque distribution control means and changes the engine output in order to obtain the engine output torque required to change the torque distribution.

The torque distribution controller 16 receives signals from the accel sensor 38, and various signals for measuring an operation quantity or momentum for controlling the torque distribution for the wheels 6 to 9. Then, the torque distribution controller 16 outputs a control signal to the brake controller 10 and the engine controller 15. Output sources for the various signals are as follows;

a steering angle sensor 40 for detecting a steering angle, a lateral acceleration sensor 41 for detecting a lateral acceleration of a car, a longitudinal acceleration sensor 42 for detecting a longitudinal acceleration of the car, a clutch sensor 43 for detecting the connection of a clutch, a wheel speed sensor 44 for detecting an engine speed of the wheels 6 to 9, an engine speed sensor 45 for detecting the engine speed, a car speed sensor 46, a gear position sensor 47 for detecting a gear position (gear speed) of a transmission 25, a boost sensor 48 for detecting a boost of the engine 2, and a yaw rate sensor 49 for detecting a yaw rate of the car.

The torque distribution controller 16 includes a load movement correspondence control section having a longitudinal distribution control system for changing the torque distribution for the front wheels 6 and 7 and the rear wheels 8 and 9 (hereinafter referred to as longitudinal torque distribution if necessary), and a lateral distribution control system for changing the torque distribution for the left wheels 6 and 8 and the right wheels 7 and 9 (hereinafter referred to as lateral torque distribution if necessary), corresponding to the load movement of the car which occurs by causing the longitudinal acceleration and lateral acceleration, a turning state correspondence control section having a longitudinal distribution control system for changing the longitudinal torque distribution, and a lateral distribution control system for changing the lateral torque distribution corresponding to the turning state of the car, and a slip state correspondence control section having a longitudinal distribution control system for changing the longitudinal torque distribution, and a lateral distribution corresponding to the slip state of the wheelscontrol system for changing the lateral torque distribution.

Explanation of the brake controller 10

Figure 3:
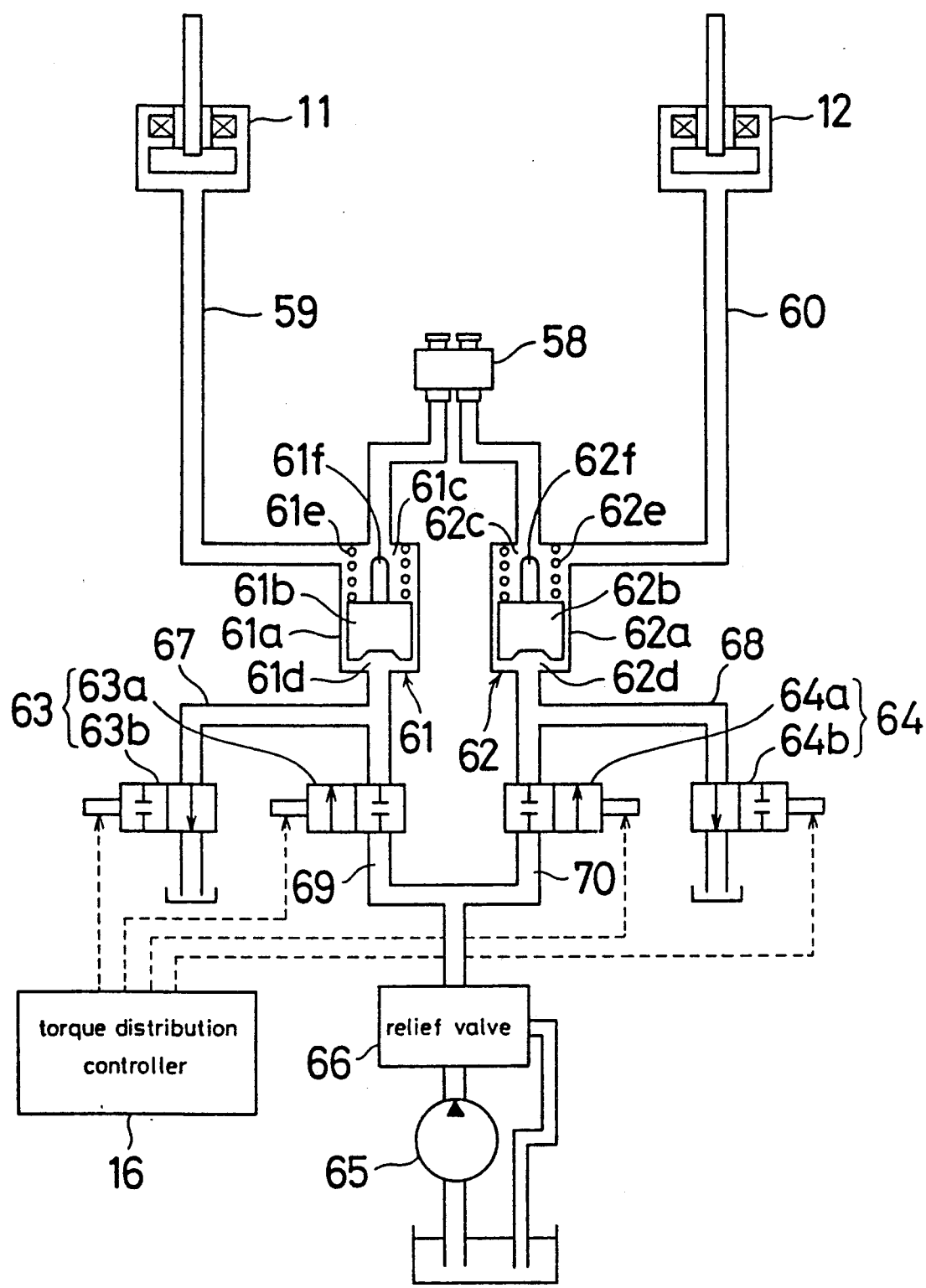

In FIG. 3, at 59 is indicated a first hydraulic line for a braking device 11 of the left front wheel 6, and at 60 is indicated a second hydraulic line for the braking device 12 of the right front wheel 7. The first and second hydraulic lines 59 and 60 have first and second braking pressure control valves 61 and 62 provided therebetween. The first and second braking pressure control valves 61 and 62 the supply of the braking pressure. In addition, the first and second braking pressure control valves 61 and 62 have cylinders 61a and 62a partitioned into variable volume chambers 61c and 62c, and control chambers 61d and 62d by pistons 61b and 62b. The variable volume chambers 61c and 62c supply the braking pressure generated by a master cylinder 58 to the braking devices 11 and 12.

The pistons 61b and 62b are energized such that the volume of the variable volume chambers 61c and 62c is increased by springs 61e and 62e, and move such that the variable volume chambers 61c and 62c are reduced against the springs 61e and 62e by the control pressure introduced into the control chambers 61d and 62d. Furthermore, the pistons 61b and 62b have check valves 61f and 62f for closing braking pressure inlets of the variable volume chambers 61c and 62c according to the movement mentioned above. Accordingly, the control pressure is introduced into the control chambers 61d and 62d so that the pistons 61b and 62b move against the springs 61c and 62e. Consequently, there is blocked the space between the master cylinder 58 and the variable volume chambers 61c and 62c. In addition, the braking pressure in the variable volume chambers 61c and 62c is supplied to the braking devices 11 and 12.

There are provided first and second actuators 63 and 64 having pressure increasing electromagnetic valves 63a and 64a and pressure reducing electromagnetic valves 63b and 64b to operate the braking pressure control valves 61 and 62. The pressure increasing electromagnetic valves 63a and 64a are provided on control pressure supply lines 69 and 70. The control pressure supply lines 69 and 70 are lead to the control chambers 61d and 62d of the braking pressure control valves 61 and 62 through an oil pump 65 and a relief valve 66. The pressure reducing electromagnetic valves 63b and 64b are provided on drain lines 67 and 68 which are lead from the control chambers 61d and 62d. The electromagnetic valves 63a, 63b, 64a and 64b are opened or closed by the signals from the torque distribution controller 16. When the pressure increasing electromagnetic valves 63a and 64a are opened and the pressure reducing electromagnetic valves 63b and 64b are closed, the control pressure is introduced into the control chambers 61d and 62d of the braking pressure control valves 61 and 62. When the pressure increasing electromagnetic valves 63a and 64a are closed and the pressure reducing electromagnetic valves 63b and 64b are opened, the control pressure is discharged from the control chambers 61d and 62d.

The braking devices 13 and 14 of the right and left rear wheels 8 and 9, which are not shown, have the same structures as those of the braking devives 11 and 12 of the front wheels 6 and 7. With the above-mentioned structures, the independent braking pressure can be applied to the braking devices 11 to 14.

There will be described the torque distribution controller 16.

Explanation of the entire flow of processing

Figure 4:
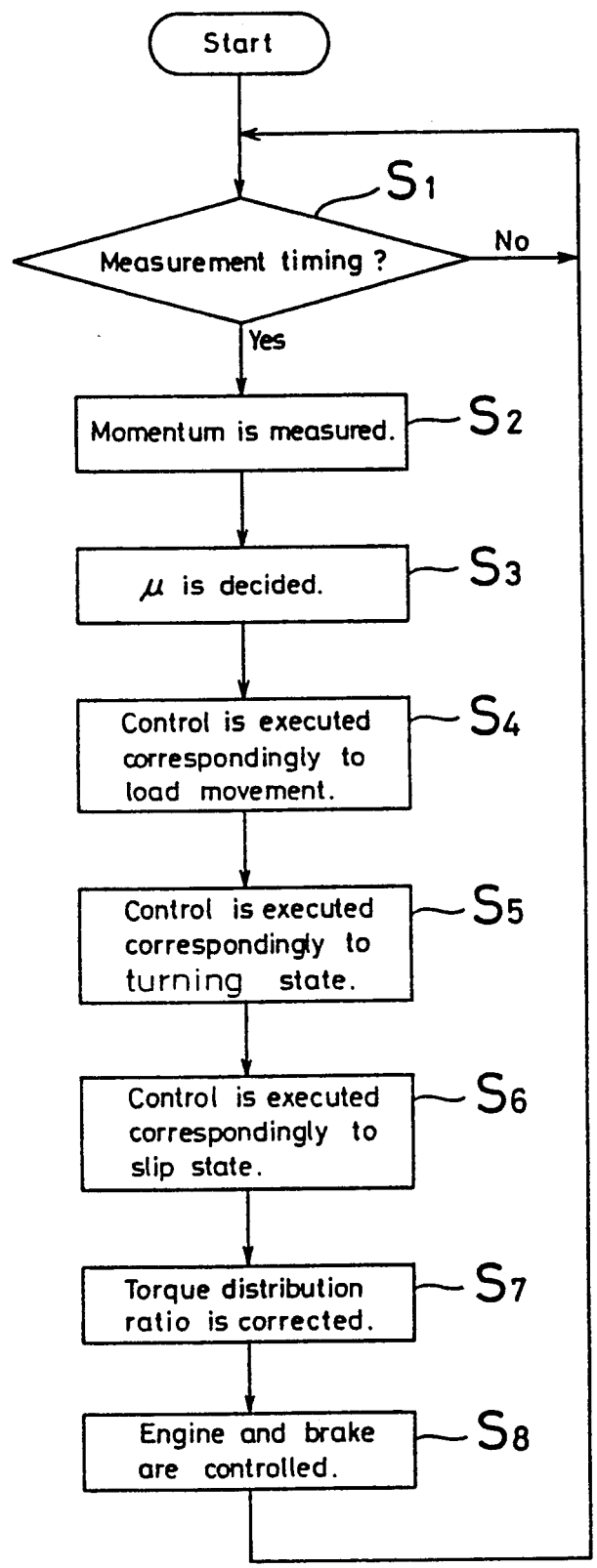

FIG. 4 shows the entire flow of processing. When a predetermined measurement timing is obtained after starting, the accel opening, steering angle, lateral acceleration, longitudinal acceleration, clutch connection, wheel speed, car speed, gear position, boost, and yaw rate are measured by the signals from the sensors 38, 40 to 49 shown in FIG. 2 (Steps S1 and S2).

Then, there are sequentially carried out the decision of $\mu$ of the road, the determination of a torque distribution ratio Q1 of the front wheels 6 and 7 to the rear wheels 8 and 9 (hereinafter referred to as a longitudinal distribution ratio if necessary) and a torque distribution ratio Q2 of the left wheels 6 and 8 to the right wheels 7 and 9 (hereinafter referred to as a lateral distribution ratio if necessary) corresponding to the load movement, the determination of a longitudinal distribution ratio R1 and a lateral distribution ratio R2 corresponding to the turning state, and the determination of a longitudinal distribution ratio P1 and a lateral distribution ratio P2 corresponding to the slip state (Steps S3 to S6).

A longitudinal distribution ratio K1 and a lateral distribution ratio K2 are corrected and determined on the basis of the torque distribution ratios Q1, R1, P1, Q2, R2 and P2 corresponding to the torque obtained by changing the engine outputs. Consequently, the brake controller 10 and engine controller 15 are controlled (Steps S7 and S8).

According to the present embodiment, the longitudinal distribution ratio K1 and the like are set such that the longitudinal distribution is uniform at 0, the driving torque of the front wheels 6 and 7 is 0 (and that of the rear wheels 8 and 9 is the maximum) at $+0.5$, and the driving torque of the rear wheels 8 and 9 is 0 (and that of the front wheels 6 and 7 is the maximum) at $-0.5$. The lateral distribution ratio K2 and the like are set such that the lateral distribution is uniform at 0, the driving torque of the left wheels 6 and 8 is 0 (and that of the right wheels 7 and 9 is the maximum) at $+0.5$, and the driving torque of the right wheels 7 and 9 is 0 (and that of the left wheels 6 and 8 is the maximum) at $-0.5$.

Explanation of $\mu$ decision

Figure 5:
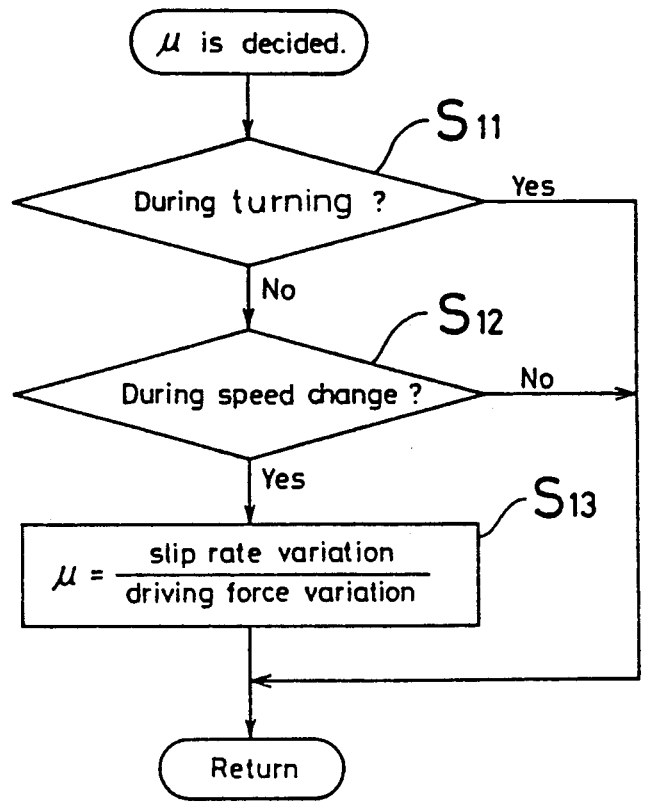

Friction coefficient decision means 20 presumes a friction coeffient $\mu$ depending on the change of the wheel speed according to that of the driving force by utilizing the fact that the driving force is equal to 0 in the straight running state of the car when changing the gear speed change. As shown in a flow of FIG. 5, if the signals from the steering angle sensor 40 and clutch sensor 43 detect that the car is in the straight running state and the gear changing state, $\mu$ is decided by the following formula (Steps S11 to S13).

$$\mu = (\text{slip rate variation})/(\text{driving force variation})$$

Figure 7:
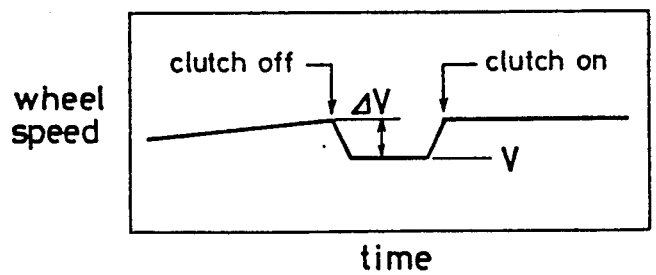

In this case, the driving force variation can be obtained as follows. In other words, the accel opening and an engine speed (RPM) are detected by the accel sensor 38 and engine speed sensor 45. The driving torque of the engine is calculated on the basis of the accel opening (accelerator pedal) and engine speed with reference to a map shown in FIG. 6. Then, the driving torque is multiplied by a gear ratio before gear speed change which is detected by the gear position sensor 47. Consequently, the driving force variation can be obtained. The slip rate variation can be obtained by the wheel speed sensor 44 as follows.

$$\text{Slip rate variation} = -\Delta v/(v + \Delta v)$$

where $\Delta v$ is a wheel speed variation according to the gear speed change and v is the minimum value of the wheel speed during the gear speed change shown in FIG. 7.

Explanation of load movement correspondence control

Figures 8, 9:
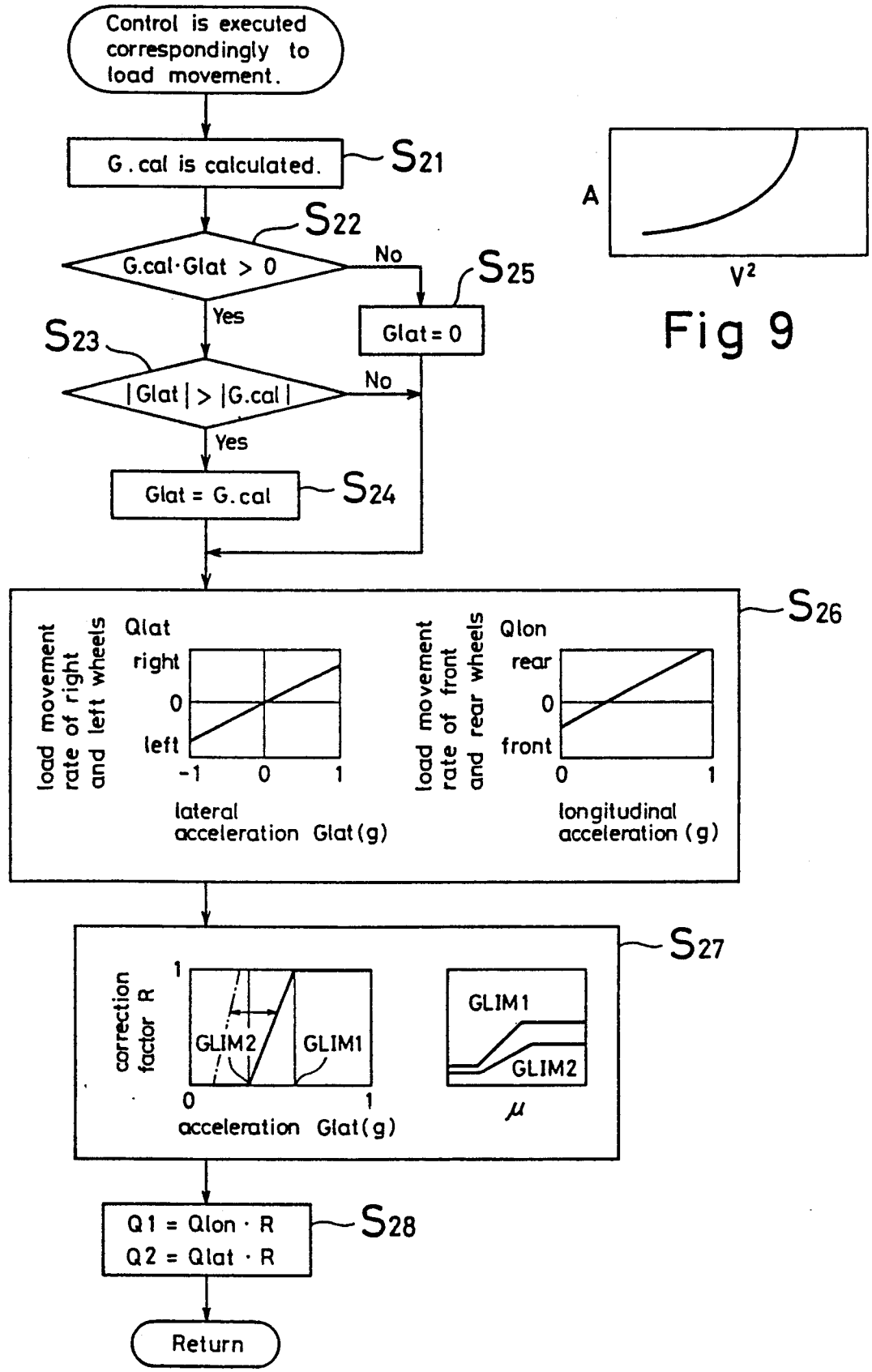

The present control is executed in accordance with a flow shown in FIG. 8. Basically, torque distribution control is executed by an actual lateral acceleration Glat and an actual longitudinal acceleration detected by the lateral acceleration sensor 41 and longitudinal acceleration sensor 42. In the case where the occurrence of the lateral acceleration is delayed for the steering on the low $\mu$ road, Glat is corrected by an ideal non-delayed calculation lateral acceleration G.cal which is obtained on the high $\mu$ road. In addition, the regions, in which the present control is executed, are changed corresponding to $\mu$ of the road.

First, there is calculated by the following formula the ideal non-delayed lateral acceleration G.cal according to the change of the steering angle and car speed (Step S21).

$$G.cal = v^2/(1 + Av^2) \cdot \theta/1$$

where v is the lowest wheel speed of four wheel speeds obtained by the wheel speed sensor 44, $\theta$ is a steering angle, and 1 is a wheel base. $A$ is a factor for obtaining the movement characteristics of the car on the high $\mu$ road. The factor $A$ is obtained with reference to a characteristic map shown in FIG. 9.

In the case where both G.cal and Glat are positive or negative and an absolute value of G.cal is smaller than that of Glat, G.cal is replaced by Glat for control. In the case where G.cal and Glat are positive and negative respectively, Glat for control is forced to be 0 (Steps S22 to S25).

There is obtained a load movement rate Q1at between the left wheels 6 and 8 and the right wheels 7 and 9 by Glat for control. There is obtained a load movement rate Qlon between the front wheels 6 and 7 and the rear wheels 8 and 9 by the longitudinal acceleration (Step S26).

Then, there are determined constants GLIM1 and GLIM2 for setting the execution range of the load movement correspondence control on the basis of the value of $\mu$. A torque distribution ratio correction factor R is obtained by the constants GLIM1 and GLIM2. The correction factor R is multiplied by the longitudinal wheel load movement rate Qlon and the lateral wheel load movement ratio Qlat, respectively. Consequently, there can be obtained the longitudinal torque distribution ratio Q1 and lateral torque distribution ratio Q2 corresponding the load movement (Steps S27 and S28).

In the region in which the longitudinal acceleration and lateral acceleration are low, the correction factor R corrects the torque distribution ratios Q1 and Q2 to be decreased when the acceleration is decreased. GLIM1 and GLIM2 are upper and lower limit values of the acceleration in which the correction factor R corrects the torque distribution ratios Q1 and Q2. If the acceleration is greater than GLIM1, the load movement rates Qlon and Qlat are the torque distribution ratios Q1 and Q2 ($R = 1$). If the acceleration is smaller than GLIM2, R is equal to 0, i.e., the torque distribution ratios Q1 and Q2 are equal to 0.

As shown in a right diagram of Step S27, GLIM1 and GLIM2 are decreased and the difference thereof is reduced when $\mu$ is made lower. In other words, a correction factor characteristic line is shifted to the left when $\mu$ is made lower as shown in a dashed line in a left diagram of Step S27. Consequently, the region, in which the load movement correspondence control is executed, is enlarged toward the low acceleration side. In addition, even if the acceleration is low, the control can be executed with a great torque distribution ratio corresponding to the load movement rate. When $\mu$ is high, the correction factor characteristic line is shifted to the right. Consequently, the load movement correspondence control is not executed until the acceleration is made comparatively high.

According to the present control, the calculation lateral acceleration G.cal corrects Glat. Consequently, even if the comparatively great lateral acceleration remains after steering, the control corresponding to the lateral acceleration can be prevented. Accordingly, the control is executed after the steering so that the excessive force can be prevented from being applied to the car. The region, in which the present control is executed, is changed corresponding to $\mu$ of the road. Consequently, unnecessary torque distribution control can be inhibited on the high $\mu$ road and the torque distribution control corresponding to the load movement can be executed on the low $\mu$ road.

Explanation of turning state correspondence control

The present control is executed in accordance with a flow shown in FIG. 10. Basically, the longitudinal distribution ratio R1 is determined on the basis of the lateral slide angle. Then, the lateral distribution ratio R2 is determined so as to obtain a target yaw rate. In addition, the distribution ratios R1 and R2 are corrected corresponding to the turning state of the car.

It is decided whether the car is in the turning state depending on the steering angle and change rate thereof obtained by the steering angle sensor 40. Consequently, a turning state decision flag F can be obtained (Step S31). In this case, the flag F means the following.

F=0 ... straight running;
The steering angle is smaller than a predetermined value.

F=1 ... turning start;
The change rate of steering angle is equal to or greater than a predetermined value in a plus direction (in which the steering angle is increased).

F=2 ... constant turning (at nearly constant turning diameter); The steering angle is equal to or greater than the predetermined value, and the change rate of steering angle is smaller than the predetermined value.

F=3 ... turning escape;
The change rate of steering angle is equal to or greater than the predetermined value in a minus direction (in which the steering angle is decreased).

If the car is in the state of turning, the longitudinal distribution ratio R1 is determined depending on a lateral slide angle and the lateral distribution ratio R2 is determined depending on the yaw rate (Steps S32 to S34). If the car is in the state of turning start and turning escape, the longitudinal distribution ratio R1 is corrected and controlled on the basis of the steering angle and change rate thereof (Steps S35 to S38).

The longitudinal distribution ratio R1 is determined depending on the lateral slide angle by means of the steering angle sensor 40, car speed sensor 46 and yaw rate sensor 49. In other words, there is obtained the lateral slide angle $\beta$ of the rear wheels 8 and 9 owing to the yaw movement of the car by the following formula. With reference to a characteristic map shown in FIG. 11, the longitudinal distribution ratio R1 is determined.

$$\beta = \text{Yaw.r} \cdot lr / V$$

Yaw.r; actual yaw rate
lr; distance from the center of gravity to the rear wheels of the car
V; car speed In this case, when the lateral slide angle $\beta$ is equal to 0, the longitudinal distribution ratio R1 is equal to 0. If the lateral slide angle $\beta$ is increased in plus and minus directions, the longitudinal distribution ratio R1 is increased in the minus direction. Referring to the yaw rate Yaw.r, the right turning is set in the plus direction. Accordingly, $\beta$ having a plus or minus sign corresponds to the right or left turning of the car.

On the other hand, the lateral distribution ratio R2 is determined depending on the yaw rate as follows. First, there is calculated the target yaw rate Y.cal on the high $\mu$ road by the lowest wheel speed v, steering angle $\theta$ and wheel base 1. Then, the lateral distribution ratio R2 is feed-back controlled so as to obtain the target yaw rate Y.cal from the difference between the target yaw rate Y.cal and the actual yaw rate Yaw. r.

In this case, the target yaw rate Y.cal is obtained by the following formula.

$$Y.cal = v/(1+\Lambda v^2) \cdot \theta / 1$$

where $\Lambda$ is a factor obtained with reference to the characteristic map shown in FIG. 9.
$\Delta Y = Y.cal - Yaw.r$ is obtained so that R2 is determined by the following formula.

$$R2 = k \Delta Y / Tr$$

where Tr is driver request torque which is the same as the driving force variation for $\mu$ decision mentioned above, and k is a constant (factor).

There will be described the correction of the longitudinal distribution ratio R1 on the basis of the steering angle and change rate thereof.

As seen from the characteristic chart for correction factors a and b and the formula for R1 (R1=a+b+R1) in Step S36, R1 is corrected so as to be increased when the steering angle and change rate thereof are increased at the time of turning start (F=1).

As seen from the characteristic chart for the correction factors a and b and the formula for R1 (R1=a+b+R1) in Step S38, R1 is corrected so as to be decreased when the steering angle and change rate thereof are increased at the time of turning escape (F=3).

According to the present control, the longitudinal distribution ratio R1 is set such that the torque distribution for the rear wheels 8 and 9 is decreased when the lateral slide angle is o23 increased. Consequently, if the lateral slip of the rear wheels 8 and 9 is increased during turning so that spin tendency is caused, the driving force of the rear wheels 8 and 9 is decreased without waiting for the decrease in quantity of drivers' steering. As a result, the lateral slip of the rear wheels 8 and 9 can be prevented so that the turning can be stabilized on the low $\mu$ road. R1 is corrected so as to be increased at the time of turning start depending on the steering angle and change rate thereof. Consequently, the small turn of the car can be enhanced. In addition, R1 is corrected so as to be decreased at the time of turning escape. Therefore, the grip force of the rear wheels can be enhanced so as to stabilize the running.

The lateral distribution ratio R2 is set by feed-back control in order to obtain the target yaw rate having the characteristics on the high $\mu$ road. Consequently, the great yaw rate can be obtained on the low $\mu$ road so as to enhance the turning steering.

In this case, if the relationship between R2 and the lateral distribution ratio Q2 corresponding to the load movement and lateral wheel load movement rate Q1at is represented by the following formula except for the turning start (F=1), $$|R2+Q2| > |Q1at|$$

R2 may be restricted to prevent the slip of the turning outer wheels depending on the excessive torque distribution as follows.

$$R2 = Q1at - Q2$$

If the actual yaw movement exceeds a target value, i.e., $|Yaw.r| > |Y.cal|$, the longitudinal distribution ratio R1 may be corrected so as to be decreased (such that the torque distribution for the rear wheels 8 and 9 is decreased) when the absolute value of R2 is increased. Consequently, the grip force of the rear wheels 8 and 9 can be enhanced to prevent the slip thereof.

Explanation of slip state correspondence control

Figure 12:
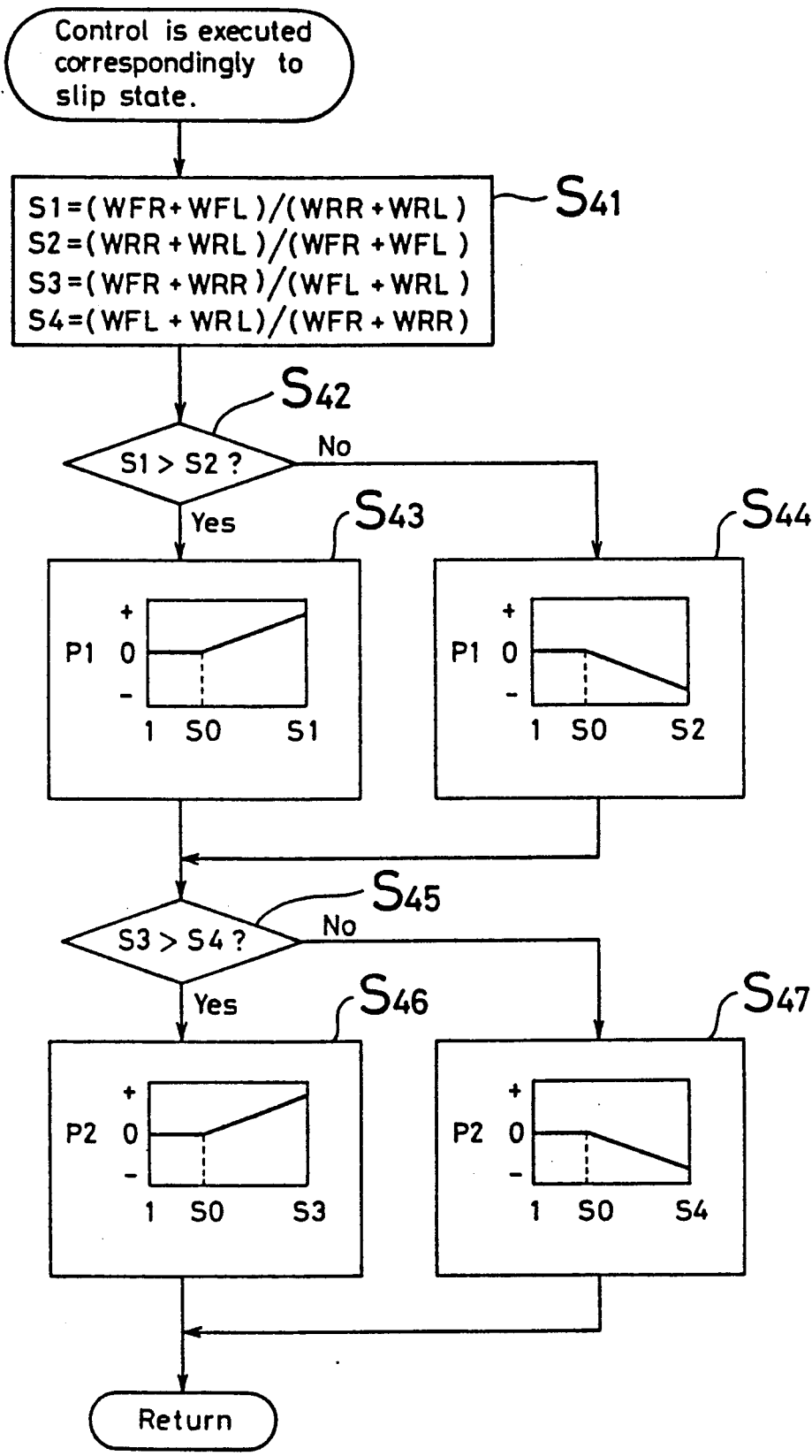

The present control is executed in accordance with a flow shown in FIG. 12, wherein the longitudinal distribution ratio P1 and lateral distribution ratio P2 are obtained depending on the slip rates of the front wheels 6 and 7 and the rear wheels 8 and 9 and those of the left wheels 6 and 8 and the right wheels 7 and 9.

First, the slip rates S1 to S4 are obtained by the wheel speed sensors 44 for the wheels (Step S41).
S1; slip rate of (front wheels/rear wheels)
S2; slip rate of (rear wheels/front wheels)
S3; slip rate of (right wheels/left wheels)
S4; slip rate of (left wheels/right wheels)

The representation in Step S41 of FIG. 12 means the following.
WFR; wheel speed of a right front wheel
WFL; wheel speed of a left front wheel
WRR; wheel speed of a right rear wheel
WRL; wheel speed of a left rear wheel If the front wheel slip rate S1 is greater than the rear wheel slip rate S2, the longitudinal distribution ratio P1 is set such that the torque distribution for the rear wheels is increased when the front wheel slip rate S1 is increased within the range of a predetermined value of S0 or more (Steps S42 and S43).

If the rear wheel slip rate S2 is greater than the front wheel slip rate S1, the longitudinal distribution ratio P1 is set such that the torque distribution for the front wheels is increased when the left wheel slip rate S2 is increased within the range of the predetermined value of S0 or more (Steps S42 and S44).

If the right wheel slip rate S3 is greater than the left wheel slip rate S4, the lateral distribution ratio P2 is set such that the torque distribution for the left wheels is increased when the right wheel slip rate S3 is increased within the range of the predetermined value of S0 or more (Steps S45 and S46).

If the left wheel slip rate S4 is greater than the right wheel slip rate S3, the lateral distribution ratio P2 is set such that the torque distribution for the right wheels is increased when the left wheel slip rate S4 is increased within the range of the predetermined value of S0 or more (Steps S45 and S47).

According to the present control, there is decreased the torque distribution for the wheels having the greater slip rate and increased the torque distribution for the wheels having the smaller slip rate. Consequently, the slip can be prevented.

Explanation of torque distribution ratio correction control

According to the present control, the longitudinal distribution ratio K1 and lateral distribution ratio K2 for the torque distribution control are corrected and determined corresponding to the torque obtained by changing the engine outputs. The present control is executed in accordance with a flow shown in FIG. 13.

Figure 6:
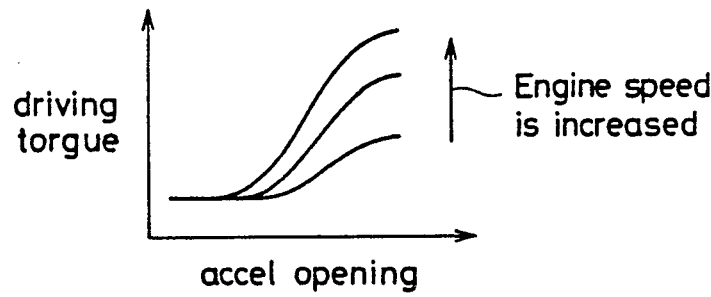

The driver request torque Tr is calculated from the accel opening, engine speed and gear ratio with reference to the map shown in FIG. 6 (Step S51).

By the following formula is calculated torque Ts which is required to execute the torque distribution conrol depending on the longitudinal distribution ratio K1=Q1+R1+P1 and the lateral distribution ratio K2=Q2+R2+P2. The required torque Ts is a target torque Ttarg (Step S52).

$$Ts = 4 \times (|K1| + 0.5) \times (|K2| + 0.5) \times Tr$$

Figure 14:
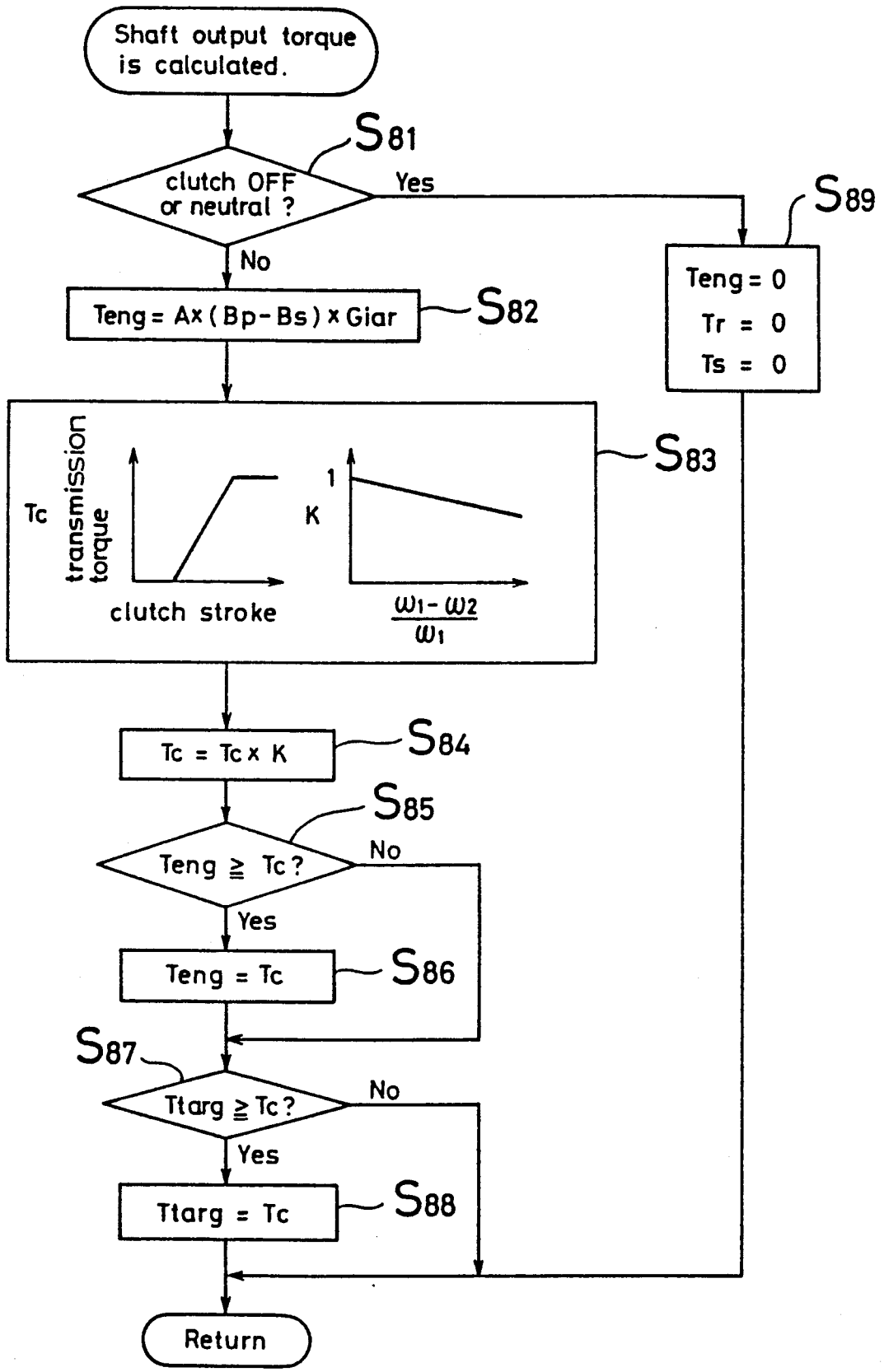

Shaft output torque Teng of the transmission 31 is calculated in accordance with a flow shown in FIG. 14 (Step S53).

If it is decided that a clutch is connected and the transmission 31 is not neutral on the basis of the outputs from the clutch sensor 43 and gear position sensor 47, the shaft output torque Teng is calculated depending on the boost and gear ratio obtained by the boost sensor 48 as follows (Steps S81 and S82).

$$Teng = \Lambda \times (Bp - Bs) \times Giar$$

$\Lambda$; boost torque constant
Bp; boost
Bs; boost reference value (driving force is zero)
Giar; gear ratio Then, transmission torque Tc of the clutch is obtained from a clutch pedal stroke and a correction factor K of friction is obtained. Consequently, the actual transmission torque Tc (=Tc×K) is obtained (Steps S83 and S84). In this case, $\omega_1$ is an engine speed (the number of rotations of an input shaft) and $\omega_2$ is the average of the number of rotations of the wheel/gear ratio (the number of rotations of the output shaft) in a correction factor characteristic chart shown in Step S83. If the shaft output torque Teng is greater than the transmission torque Tc. Teng is restricted to Te (Steps S85 and S86).

The target torque Ttarg is compared with the transmission torque Tc. If Ttarg is greater than Tc, Ttarg is restricted to Tc (Steps S87 and S88).

If the clutch is disconnected or the transmission 31 is neutral, Teng, Tr and Ts is zero (Step S89) so that the torque distribution control is stopped.

Figure 13A:
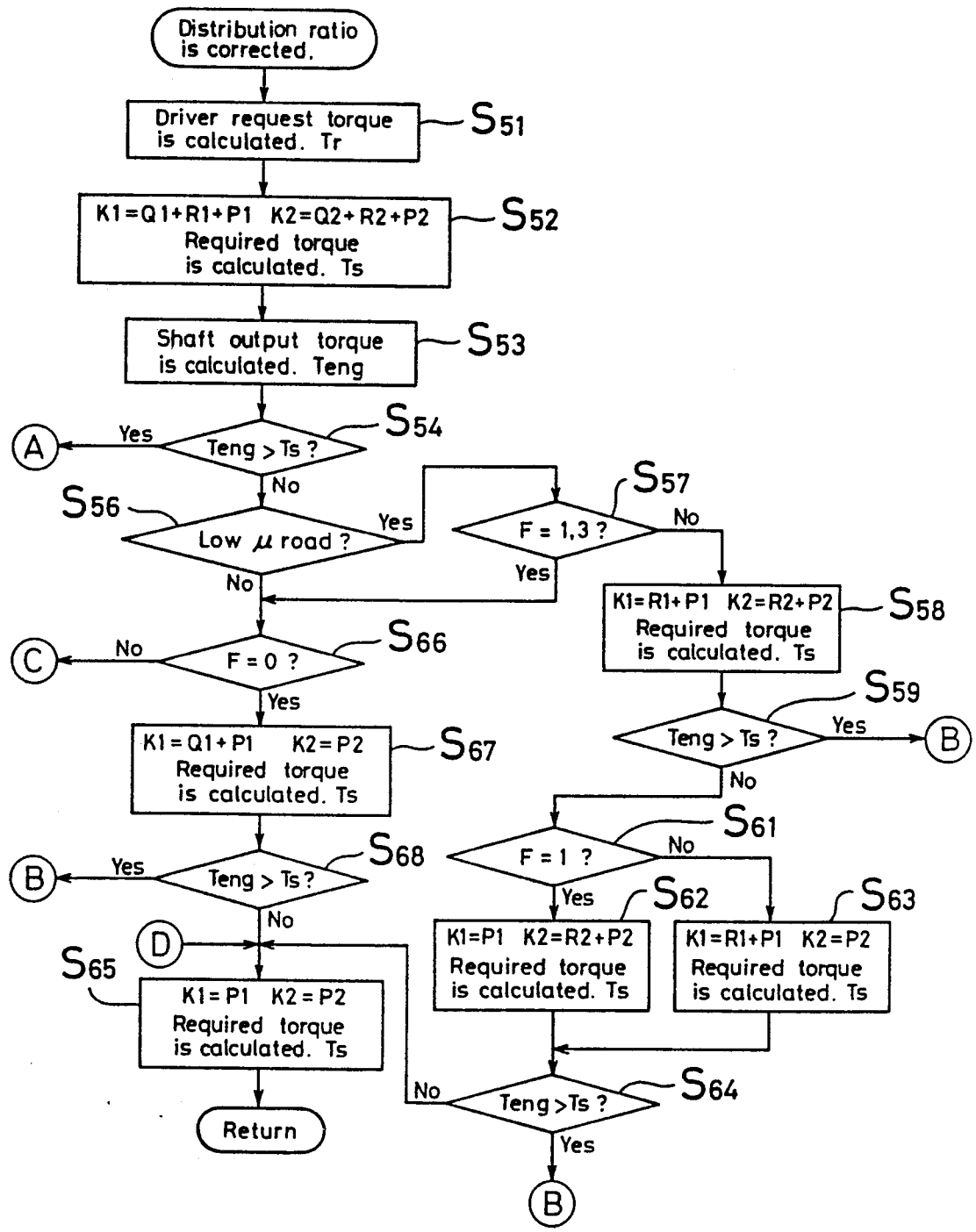
FIGS. 13A and 13B are flow charts of distribution ratio correction control.
Figure 13B:
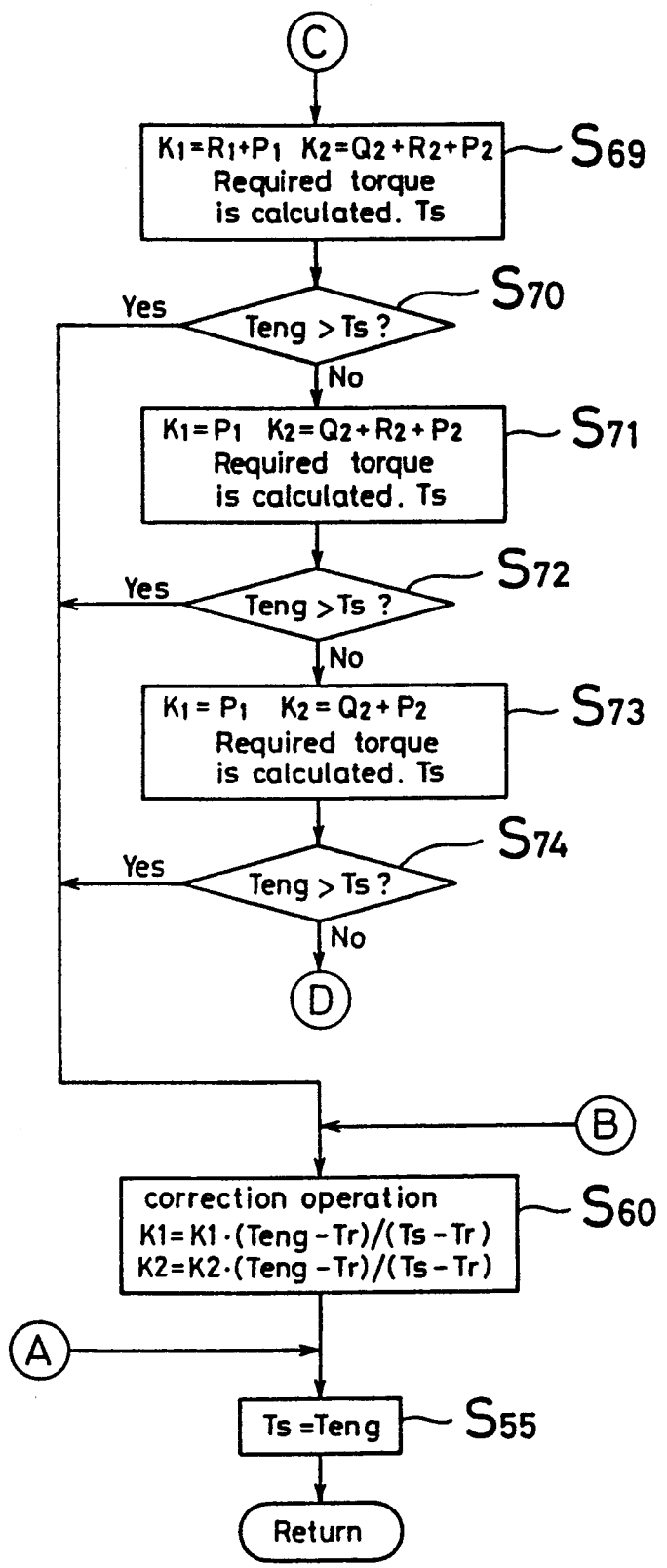

Returning to the flow shown in FIG. 13, if the shaft output torque Teng is greater than the required torque Ts obtained in Step S52, the shaft output torque can fully execute the torque distribution control (Teng>Ts in Step S54). Accordingly, the longidudinal distribution ratio K1 and lateral distribution ratio K2 are set as follows. In addition, Ts is set as the shaft output torque (Step S55). Consequently, the engine and brake are controlled (as described below).

$$K1 = Q1 + R1 + P1$$

$$K2 = Q2 + R2 + P2$$

If Teng is smaller than Ts and it is decided that $\mu$ is smaller than a predetermined value in Step S54, there are selected R1 and R2 corresponding to the turning state and P1 and P2 corresponding to the slip rates as the longitudinal and lateral distribution ratios in order to execute the turning state correspondence control and slip state correspondence control with priority at the time of turning start and turning escape (F=1, 3).

Consequently, there is calculated the torque Ts required for the distribution ratios mentioned above (Steps S56 to S58).

$$K1 = R1 + P1$$

$$K2 = R2 + P2$$

The shaft output torque Teng is compared with the required torque Ts (Step S59). If Teng is greater than Ts, this routine proceeds to Step S60 at which K1 and K2 are corrected by the following formulas.

$$K1 = K1 \cdot (Teng - Tr)/(Ts - Tr)$$

$$K2 = K2 \cdot (Teng - Tr)/(Ts - Tr)$$

Since the distribution ratios Q1 and Q2 are reduced, the shaft output torque Teng is made sufficient. Thus, the distribution ratios K1 and K2 are corrected so as to approximate to the distribution ratios in Step S52. Preferably, the correction is executed such that the reduced distribution ratios (Q1 and Q2) are partially returned as much as possible.

Accordingly, the shaft output torque Teng is set as the required torque Ts in Step S55.

If Teng is not greater than Ts in Step S59, there is selected the distribution ratio obtained by reducing the longitudinal distribution ratio R1 corresponding to the turning state in order to execute the lateral distribution control with priority at the time of turning start (F=1). Thus, there is calculated the torque Ts required for the distribution ratio mentioned above (Steps S61 and S62).

$$K1 = P1$$

$$K2 = R2 + P2$$

If the decision is No in Step S61, i.e., the car is in the state of turning escape (F=3), there is selected the distribution ratio obtained by reducing the lateral distribution ratio R2 corresponding to the turning state in order to execute the longitudinal distribution control with priority. Thus, there is calculated the torque Ts required for the distribution ratio mentioned above (Step S63).

$$K1 = R1 + P1$$

$$K2 = P2$$

The shaft output torque Teng is compared with the required torque Ts (Step S64). If Teng is greater than Ts, this routine proceeds to Step S60 at which K1 and K2 are corrected. Then, Ts is set at Step S55.

If the shaft output torque Teng is smaller than the required torque Ts in Step S64, there are selected P1 and P2 corresponding to the slip rates as the longitudinal and lateral distribution ratios. Thus, the required torque Ts is calculated (Step S65).

$$K1 = P1$$

$$K2 = P2$$

In this case, the distribution ratio is not corrected and calculated. K1, K2 and Ts are used for engine and brake control.

If it is decided that $\mu$ is high in Step S56 and the decision is No, i.e., the car is in the state of straight running (F=0) or turning (F=2) in Step S57, it is decided whether the car is in the state of straight running (Step S66).

If the car is in the state of straight running, there are selected Q1 corresponding to the load movement rate and P1 corresponding to the slip rate as the longitudinal distribution ratios and P2 corresponding to the slip rate as the lateral distribution ratio. Thus, the required torque Ts is calculated (Step S67).

$$K1 = Q1 + P1$$

$$K2 = P2$$

The shaft output torque Teng is compared with the required torque Ts (Step S68). If Teng is greater than Ts, this routine proceeds to Step S60. If the shaft output torque Teng is smaller than the required torque Ts, this routine proceeds to Step S65.

If the decision is No in Step S66, i.e., the car is in the state of turning (F=1.2 or 3) on the high $\mu$ roads and in the state of constant turning (F=2) on the low $\mu$ roads, Q1, R1, R2 and Q2 are sequentially reduced until Teng is made greater than Ts in order to execute the lateral distribution control with priority. When Teng is greater than Ts, this routine proceeds to Step S60. If Teng is not finally greater than Ts, this routine proceeds to Step S65 (Steps S69 to S74).

Explanation of engine and brake control

Figure 15:
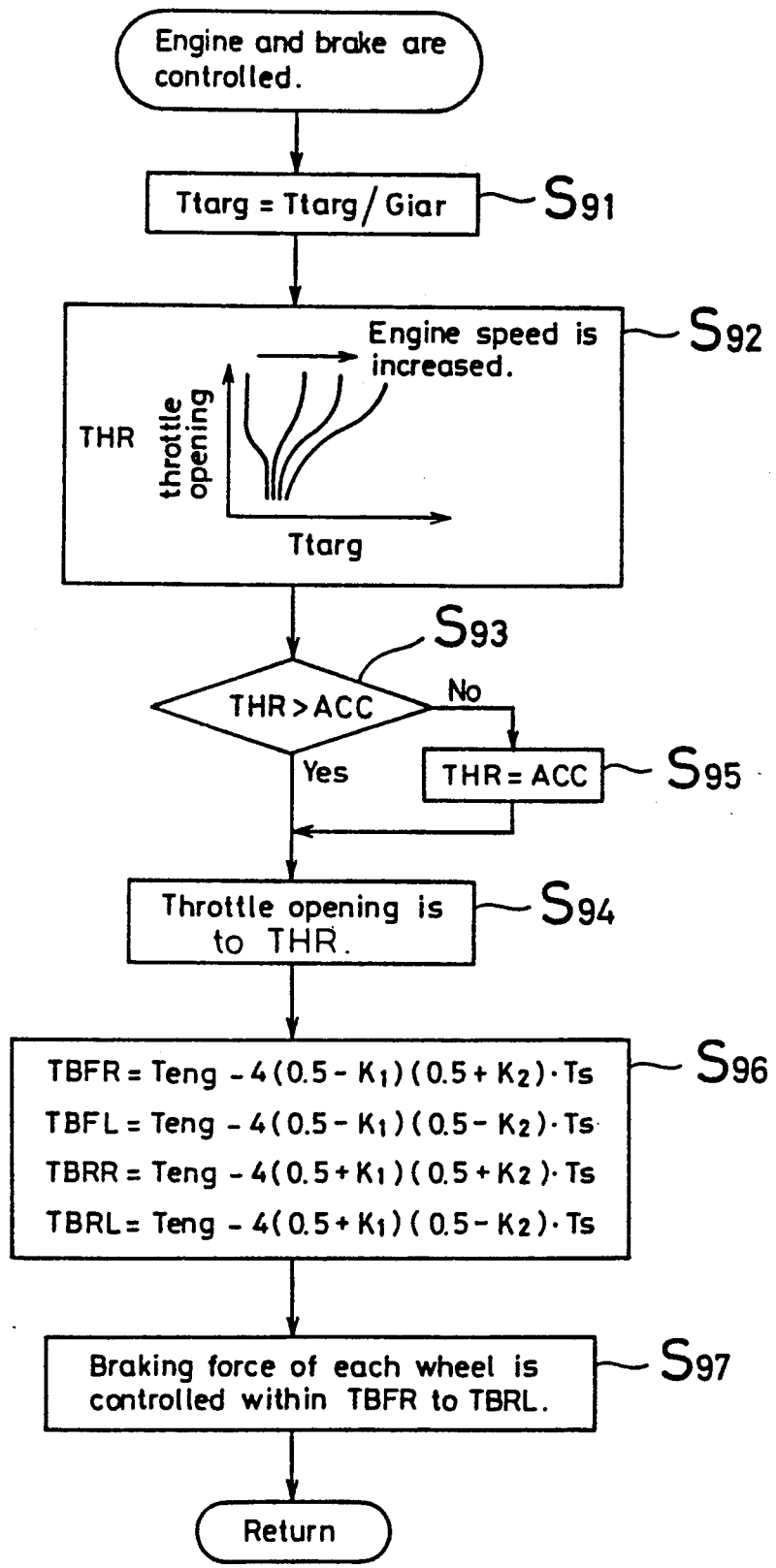

The engine controller 15 and brake controller 10 are controlled on the basis of the required torque Ts (target torque Ttarg) and the longitudinal and lateral distribution ratios K1 and K2 in accordance with a flow shown in FIG. 15.

More specifically, there is calculated the target output torque Ttarg required for engines. Thus, throttle opening THR is obtained with reference to an output torque/throttle opening characteristic map (Steps S91 and S92).

$$Ttarg = Ttarg/Giar$$

The throttle opening of the engine 2 is set to THR by the engine controller 15. In this case, if THR is smaller than accel opening ACC depending on the drivers' operation, the engine controller 15 is controlled so as to obtain the throttle opening corresponding to the accel opening ACC (Steps S93 to S95).

By the following formulas are calculated the braking torque TBFR (right front wheel), TBFL (left front wheel), TBRR (right rear wheel) and TBRL (left rear wheel) to be applied to the wheels 6 to 9 on the basis of the distribution ratios K1 and K2. Control signals are outputted to the brake controller 10 in order to obtain the braking torque mentioned above (Steps S96 and S97).

$$TBFR = Teng - 4(0.5-K1) \times (0.5+K2) \times Ts$$

$$TBFL = Teng - 4(0.5-K1) \times (0.5-K2) \times Ts$$

$$TBRR = Teng - 4(0.5+K1) \times (0.5+K2) \times Ts$$

$$TBRL = Teng - 4(0.5+K1) \times (0.5-K2) \times Ts$$

According to the torque distribution control mentioned above, when the shaft output torque Teng is small, $K1 = R1 + P1$ and $K2 = R2 + P2$ at the time of turning start and turning escape on the low $\mu$ road (in which the momentum such as the lateral acceleration and yaw rate for drivers' steering is much smaller as compared with the high $\mu$ road). Consequently, the turning state correspondence control is executed prior to the load movement correspondence control. As a result, the car receives the great momentum suitable for turning. Thus, the quantity of drivers' steering is prevented from being increased so that the running stability and operation of the car can be enhanced.

At the time of turning start, $K1 = P1$ and $K2 = R2 + P2$ so that the lateral distribution control is executed with priority. At the time of turning escape, $K1 = R1 + P1$ and $K2 = P2$ so that the longitudinal distribution control is executed with priority. Consequently, the torque distribution for the turning outer wheels is increased so that the small turn of the car can be enhanced. In addition, the torque distribution for the rear wheels is decreased at the time of turning escape so that the slip or excessive autorotation of the wheels can be smoothly prevented from being caused. Thus, the straight running can be smoothly attained at the time of turning escape.

On the high $\mu$ road, the load movement correspondence control or lateral distribution control is executed with priority during turning. Consequently, the driving torque 13 corresponding to the load movement is applied to the wheels so that the slip of the wheels can be prevented and the turning can be enhanced.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A torque distribution control apparatus for a four wheel drive in which four wheels of a car are driven by engine outputs and driving torque distribution for the four wheels is changed, comprising;

torque distribution change means for adjusting a quantity of the engine outputs to be transmitted to the four wheels so as to change the torque distribution, engine output change means for increasing the engine outputs so as to compensate for the torque required to change the torque distribution, friction coefficient detection means for detecting a friction coefficient of a road, torque distribution control means having a plurality of control systems for setting the torque distribution ratio for the four wheels and controlling the torque distribution change means and engine output change means corresponding to the operating conditions of the car on the basis of the control systems, and control system selection means for selecting a control system to execute the control corresponding to the friction coefficient of the road when the torque required to change the torque distribution by the control systems is not obtained even if the engine outputs are changed.

2. A torque distribution control apparatus for a four wheel drive according to claim 1, further comprising running state detection means for detecting the turning start and escape state of the car, wherein the control system selection means selects the control system to execute the control corresponding to the friction coefficient of the road and the running state of the car.

3. A torque distribution control apparatus of a four wheel drive according to claim 2, wherein the torque distribution control means has a longitudinal distribution control system for changing the torque distribution for front and rear wheels and a lateral distribution control system for changing the torque distribution for right and left wheels.

4. A torque distribution control apparatus of a four wheel drive according to claim 3, wherein the control system selection means selects the lateral distribution control system with priority at the time of turning start when the friction coefficient of the road is low.

5. A torque distribution control apparatus of a four wheel drive according to claim 3, wherein the control system selection means selects the longitudinal distribution control system with priority at the time of turning escape when the friction coefficient of the road is low.

6. A torque distribution control apparatus of a four wheel drive according to claim 3, wherein the control system selection means selects the lateral distribution control system with priority during turning when the friction coefficient of the road is high.

7. A torque distribution control apparatus of a four wheel drive according to claim 2, wherein the torque distribution control means has a load movement correspondence control system for changing the torque distribution for the four wheels corresponding to the load movement of the car, a turning state correspondence control system for changing the torque distribution for the four wheels corresponding to the turning state of the car, and a slip state correspondence control system for changing the torque distribution for the four wheels corresponding to the slip state of the wheels.

8. A torque distribution control apparatus of a four wheel drive according to claim 7, wherein the control system selection means sequentially selects the slip state correspondence control system, turning state correspondence control system and load movement correspondence control system with priority at the time of turning start when the friction coefficient of the road is low.

9. A torque distribution control apparatus of a four wheel drive according to claim 7,
wherein the control system selection means sequentially selects the slip state correspondence control system, turning state correspondence control system and load movement correspondence control system with priority at the time of turning escape when the friction coefficient of the road is low.

10. A torque distribution control apparatus of a four wheel drive according to claim 1,
wherein the torque distribution control means has a longitudinal distribution control system for changing the torque distribution for front and rear wheels and a lateral distribution control system for changing the torque distribution for right and left wheels.

11. A torque distribution control apparatus of a four wheel drive according to claim 1,
wherein the torque distribution control means has a load movement correspondence control system for changing the torque distribution for the four wheels corresponding to the load movement of the car, a turning state correspondence o23 control system for changing the torque distribution for the four wheels corresponding to the turning state of the car, and a slip state correspondence control system for changing the torque distribution for the four wheels corresponding to the slip state of the wheels.

* * * * *